United States Patent [19]
Popelar et al.

[11] 3,734,530
[45] May 22, 1973

[54] VEHICLE SUSPENSIONS

[75] Inventors: Vladimir Popelar, Prague; Oldrich Rye, Pribor, both of Czechoslovakia

[73] Assignee: TATRA, narodni Podnik Koprivnice, Czechoslovakia

[22] Filed: Dec. 29, 1970

[21] Appl. No.: 102,425

[30] Foreign Application Priority Data

Dec. 30, 1969 Czechoslovakia............8620/69

[52] U.S. Cl..................................280/81.5, 180/24
[51] Int. Cl. ...........................................B62d 13/00
[58] Field of Search......................280/81.5, 104.5, 280/91; 180/24.01, 24.11, 24.13, 24

[56] References Cited

UNITED STATES PATENTS

| | | |
|---|---|---|
| 3,055,675 | 9/1962 | Brecko et al............................280/91 |
| 1,818,902 | 8/1931 | Marcum..................................280/91 |
| 1,815,416 | 7/1931 | Marcum..............................280/91 X |
| 1,871,432 | 8/1932 | Fageol....................................280/91 |
| 2,323,669 | 7/1943 | Murty et al............................280/91 |

Primary Examiner—Gerald M. Forlenza
Assistant Examiner—Frank E. Werner
Attorney—Richard Low and Murray Schaffer

[57] ABSTRACT

A suspension system for a vehicle having a longitudinal axis. The vehicle is provided with at least three pair of wheels, at least two of which are tandemly arranged and provided with means for steering. The tandemly arranged wheels are respectively sprung by a leaf spring parallel to the axis. Each leaf spring is located on opposite sides of the axis and nearer to the axis than to the respective wheels.

3 Claims, 1 Drawing Figure

PATENTED MAY 22 1973 3,734,530
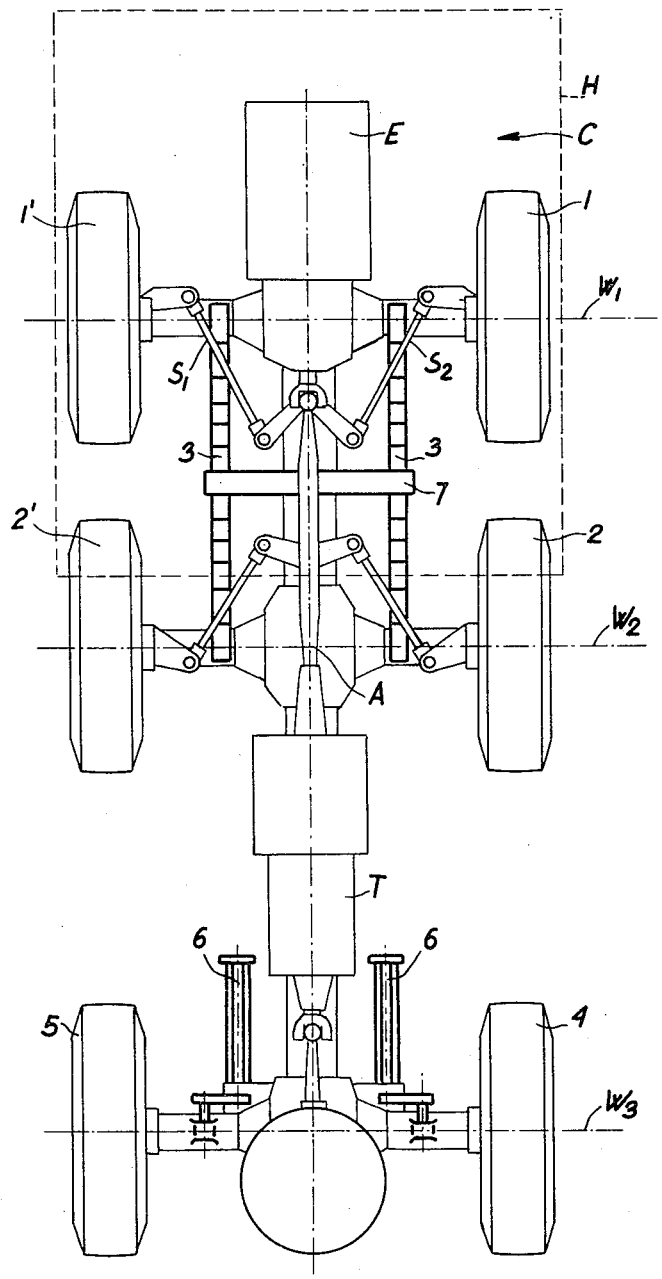
VLADIMÍR POPELÁŘ
OLDŘICH RYC
INVENTORS
BY [signature]
ATTORNEY

VEHICLE SUSPENSIONS

BACKGROUND OF INVENTION

The present invention relates to heavy duty vehicles and to suspension systems therefor.

In particular, the present invention relates the wheel suspension system of a vehicle having at least six wheels of which the four front wheels are steerable.

Resilient suspension of individual vehicle axles has been accomplished comventionally by suspending each wheel with either transversal or longitudinal spring systems. In vehicles having more than two sets of wheels, the two front wheel pairs (i.e. in the direction of the longitudinal axial direction of movement) are also both steerable so that the direction of travel may be controlled. Suitable joints or hinges are provided between these wheels when simultaneous control is desired. An advantage of this arrangement, in addition to the good maneuverability, resides in the fact that such the undercarriage employing such systems resist very heavy loads and are therefor highly suitable for use in special vehicles such as trucks, tractors and over-the-road vehicles.

A disadvantage, however, exists in that complicated transmission elements, including complex joints, rod mechanism, and the like, are required in order to control the independently sprung outer wheel pairs. As a result, a great deal play and inaccuracy is introduced into the mechanism which under heavy duty create uneven loading of the individually controlled axles. In extreme cases even zero loading may occur on the springs. As a consequence the vehicle becomes difficult to handle and incertain cases may even lose its maneuverability and controllability.

It is an object of the present invention to provide a vehicle suspension system overcoming the disadvantages of the prior art.

It is another object of the present invention to provide a vehicle suspension system which provides more uniform loading characteristics.

It is still another object to provide a vehicle suspension system in which the steerable wheels are more evenly balanced and sprung.

It is an object of this invention to obtain a suspension system for a motor vehicle having more than two pairs of wheels, which is simple, efficient and highly durable.

These objects, others and numerous advantages, will be seen in the following description.

SUMMARY OF INVENTION

According to the present invention a system is provided in which the steerable wheels are cooperatively sprung by means of leaf springs arranged in parallel with, and symmetrically to, the longitudinal axis of the vehicle and respectively secured between tandemly arranged wheel pairs. Preferably, the springs are located nearer to the central axis of the vehicle than to the wheels themselves. The non-steerable wheels are each sprung separately by means of longitudinal torsion rods.

The advantage of the suspension system of the present invention resides in the fact that uniform loading of the front steering wheels is affected. This is of great importance when the vehicle is used as the tractor for heavy duty trailers. Contact of all wheels with the road surface is greatly enhanced even when driving in open or rough country so that maneuverability of the vehicle under all conditions is secure and easy. Another advantage arises out of the fact that the four front wheels which accomplish direction steering can be cooperatively provided with a differential load with respect to the non-steerable rear wheels. Preferably, the front wheels are best placed under a greater load.

BRIEF DESCRIPTION OF DRAWING

The invention will be best understood from the following specification to be read in conjunction with the accompanying drawing illustrating a preferred embodiment. The single FIGURE of the accompanying drawing illustrates a schematic plan view of the arrangement of a motor vehicle with six wheels.

DESCRIPTION OF INVENTION

In the drawing there is seen a vehicular undercarriage for a vehicle such as a truck or trailer tractor having a chassis C, a central longitudinal drive shaft A along which are mounted, from front to rear, an engine E and transmission T which may be used to drive one or more of the vehicle wheels. Mounted above the front of the chassis is the driver's cab H or merely a hood or other covering for the engine. Located transversely to the drive shaft A are three wheel axles $W_1$, $W_2$ and $W_3$. The front two wheel axles members $W_1$ and $W_2$ are located forwardly of the transmission or the center of the vehicle, with closer to the front axle $W_1$ than it is to the rear axle $W_3$. Mounted on each axle in conventional manner are a pair of wheels 1,1'; 2,2'; and 4,5; respectively. Wheels 1,1' and 2,2' are each mounted so that they can be turned in conventional manner; in this connection wheels 1,1' and 2,2' are each interconnected with steering control rods $S_1$ and $S_2$ which if also desired can themselves be interconnected so that the forward sets of wheels are conjointly steerable. Axles $W_1$ and $W_2$ are conventional and are pivoted to move up and down to either side of the drive shaft.

The rear wheel 4 and 5 are each mounted for non-controlled (i.e. not steerable) rotation. The axle $W_3$ is therefore fixed.

It will be appreciated that as so far described the drawing shows schematically conventional undercarriage drive and wheel systems for a trailer or truck tractor. Many details have been omitted from the drawings since they are very conventional and well known and reference can be made to any one of a number of patents and publications for such details as may be necessary.

According to the present invention a symmetrical leaf spring 3 interconnects and suspends each tandemly arranged pair of wheels 1 and 2 and 1' and 2' respectively. Each of the springs 3 is arranged parallel and equidistant from the axis of the vehicle as defined for example by the drive shaft A. Each leaf spring is arranged closer to the longitudinal center of the vehicle than it is to the wheel which it suspends. The ends of the springs are secured to the respective portions axles $W_1$ and $W_2$ in conventional manner by known fastening means. The leaf springs are connected, by a tie rod or bar 7 secured transversely between their centers, to the vehicle frame or cab H.

The rear wheels 4 and 5 are individually suspended by torsion rods springs 6 located adjacent to each side of the rear transmission box.

The leaf springs 3 and torsion rod springs 6 are themselves conventionally formed and function to provide their usual results. Nevertheless, the leaf springs 3, located and arranged in the manner shown, cooperate to provide an improved suspension system, avoiding the defects and disadvantages of the prior art system. The present arrangement provides a uniform spring loading of the pairs of tandemly arranged front wheels. Thus, wheels 1 and 2 and 1' and 2' are evenly balanced and will give a smoother ride over rough terrain. The location of the springs which is closer to the drive shaft will permit more rugged construction yet enable the wheels to ride over hills and holes more smoothly. Because the wheels are tandemly sprung, they may be steered with greater ease since each pair will respond similarly to control maneuvers.

The arrangement permits the auxiliary steering controls to be simpler and less complicated; permitting them to be maintained with greater accuracy and efficiency. The two rear wheels being independently sprung provide smooth loading when less stress is placed on the vehicle. Since neither of these wheels are turnable and move only in the longitudinal direction, they are best loaded with the independent springs. However, in combination with the spring system for the front wheels, they provide the tractor with a highly stable, rugged and efficient suspension system.

Numerous modifications will be apparent to those skilled in this art. The nature and particular form of the springs may be changed to suit the size, weight and loadcarrying ab-ilities of the tractor. The torsion rods may be replaced with, or supplemented by, shock absorbers or other spring means. The various steering elements may also be modified. Accordingly, it is intended that the disclosure be taken as illustrative only of the present invention and not limiting.

What is claimed:

1. In a vehicle having a frame, a central tube defining a longitudinal axis and three pair of wheels, the wheels of two of said pairs being respectively tandemly arranged and mounted on pivotable axle portions for steering, and provided with a suspension system comprising a pair of leaf springs, said leaf springs being respectively connected at their ends to the axle portions of the respective tandemly arranged wheels, said leaf springs being each arranged on opposite sides of said axis, parallel to said axis and nearer to said axis than to said wheels, and a tie rod extending transversely of said axis connecting the centers of said leaf springs to said central tube, the remaining pair of wheels being non-steerable and being mounted respectively at each end of a fixed axle remote from the other wheels, said remaining wheels being provided with a suspension system comprising a torsion rod associated with each of said wheels to individually spring said remaining wheels.

2. The system according to claim 1 including means for conjointly steering said respective tandemly arranged wheels.

3. The system according to claim 1 wherein said two pairs of wheels are located forwardly of the center of said vehicle.

* * * * *